May 1, 1923.
J. J. HOLSEN
COMBINATION TOOL
Filed March 20, 1919
1,453,979
2 Sheets-Sheet 2
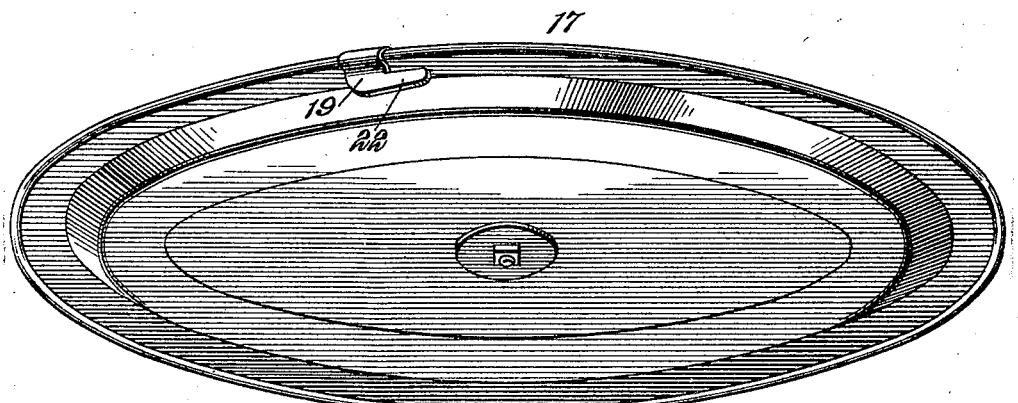
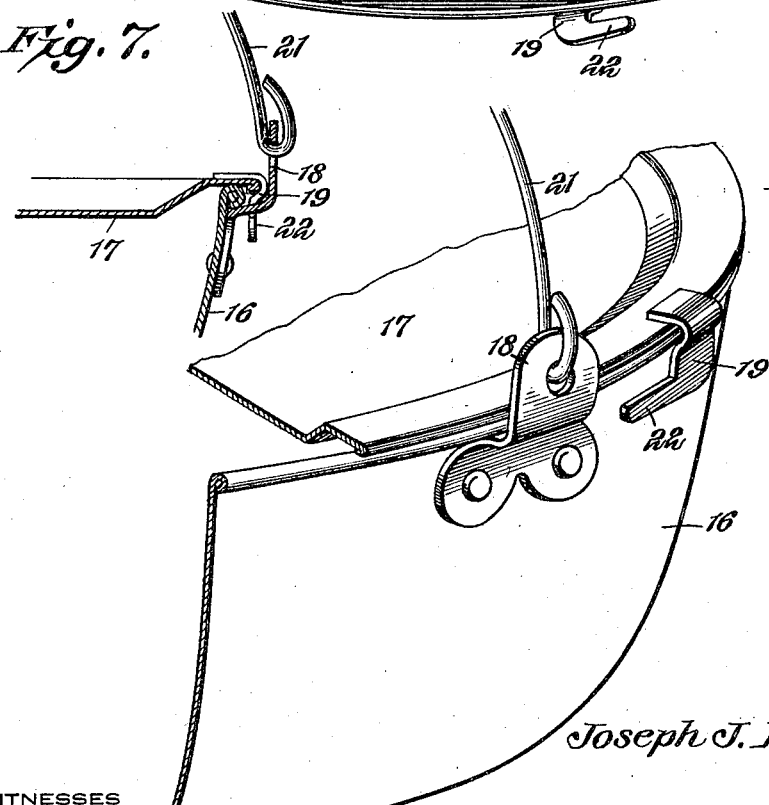
Joseph J. Holsen,
INVENTOR,
WITNESSES
BY
ATTORNEY Patented May 1, 1923.

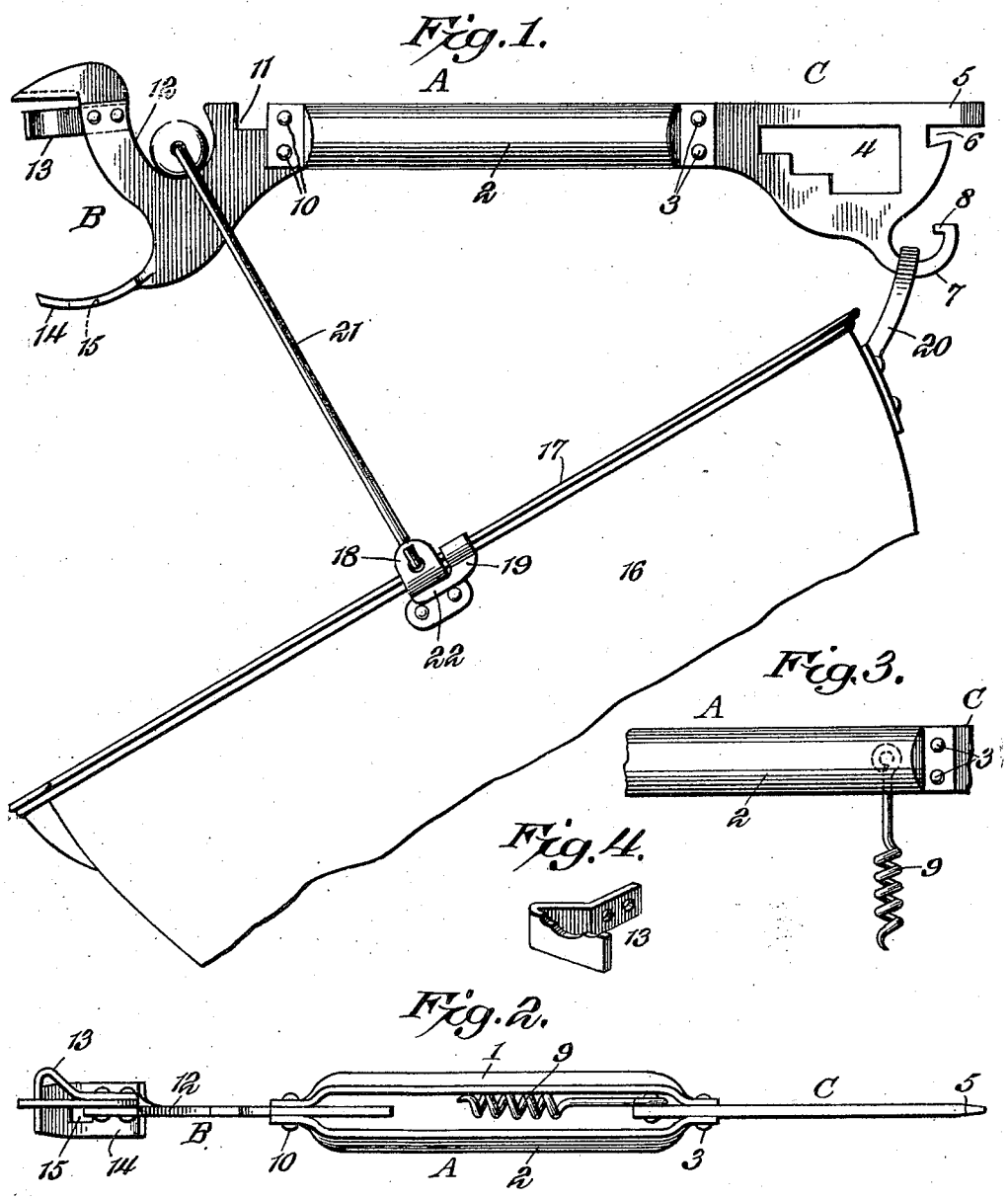

1,453,979

UNITED STATES PATENT OFFICE.

JOSEPH J. HOLSEN, OF MANITOWOC, WISCONSIN.

COMBINATION TOOL.

Application filed March 20, 1919. Serial No. 283,901.

*To all whom it may concern:*

Be it known that I, JOSEPH J. HOLSEN, a citizen of the United States, residing at Manitowoc, in the county of Manitowoc and State of Wisconsin, have invented a new and useful Combination Tool, of which the following is a specification.

This invention relates to combination kitchen tools.

The object of the invention is to provide a handy tool for use about the kitchen to aid in the performance of the manifold duties which are imposed upon the cook, the tool being simple in construction, easy to manipulate, impossible to get out of order, and capable of manufacture at a cost within the means of the average housewife.

A special object of the invention is to provide a tool which is adapted to be used in tilting a kettle or other vessel having a cover retained in place thereon, for the purpose of draining off the water from the material being cooked without spilling the latter or inflicting injury to the operator, this special object not having been carried out previously by any tool, so far as I am aware.

The invention consists in the features of construction and the combination of parts hereinafter particularly recited and pointed out in the claims; it being understood that while I have shown the preferred embodiment of my invention, I do not wish to be limited to the exact form, size, proportion and the minor details of construction, and wish the privilege of making such changes as may fairly come within the scope of the appended claims.

In the accompanying drawing—

Figure 1 represents a side elevation of the tool engaged with the looped handle and wire bail of a kettle or vessel, the latter being shown in a tilted position;

Fig. 2 is a top plan view of the tool;

Fig. 3 is a detail view showing the corkscrew in an extended position;

Fig. 4 is a detail view of one element of the can-opener part of the tool;

Fig. 5 is a detail perspective view of the cover showing the hooks thereon;

Fig. 6 is a detail view showing how one of the hooks is engaged with the ear of the kettle or vessel in holding the cover in place; and Fig. 7 is a sectional view through portions of the cover and kettle showing the engagement of one of the hooks with an ear.

Like numerals of reference indicate corresponding parts in all the figures of the drawing.

Referring to the drawing, the tool in the detail form shown consists essentially of three elements, the handle element A, the bail-engaging element B, and the handle-engaging element C. While these elements are shown as made up of several parts connected together, it is obvious that in the simplest form of this invention, and which I wish to be understood as being comprehended within the scope of my claims, the tool could be constructed with the said elements in one piece, but this construction would deprive the tool of many of its advantageous features, and I prefer the construction illustrated.

The handle member A is composed of two plates 1 and 2 which are rounded transversely to approach a simicircle and enable them to fit the hand. These plates are of sufficient length to constitute a hand grasp. They approach each other at their opposite ends, where they are riveted as at 3 and 10 to the respective members C and B, the ends of said members projecting within and between the said plates for a short distance. The longitudinal edges of said plates are spaced apart at the top and bottom for the purpose of receiving a corkscrew 9, which is pivoted to the extended inner end of the member C. The corkscrew in its normal position lies horizontally within the handle member and between the two plates, as shown in Fig. 2 of the drawing, but when desired for use, the corkscrew may be extended to the position shown in Fig. 3. Sufficient space is provided between the longitudinally opposed edges of the plates to allow for the insertion of a finger or any instrument when it is desired to unfold the corkscrew.

The handle member constructed in the manner described provides a nonconductor of heat, this being specially desirable when it is considered that the device is used about a kitchen range, and, besides, it forms a housing or enclosure for the corkscrew.

The front or bail-engaging member B, which is made of flat metal set edgewise, is provided at one side with a recess or seat 12, which is adapted to receive a wooden spool or handle of the bail 21 of the vessel 16, as shown in Fig. 1 of the drawings. Where, however, the vessel or bail is not provided with a wooden spool or handle, the recess or seat 11, which is located at one side of the recess or seat 12, and which is of less depth and size, may be used to engage or receive the wire bail. The seats open out at one side of the tool, which is the upper side when the tool is in actual use, and said seats have side walls to hold the bail in engagement. The member B is provided at one extremity with the elements of a can opener 13, which need not be described, as they form no part of the present invention, and at the other side said member is provided with a stove lifter 14, having a recess 15, which may be used as a wrench socket in screwing on or off small nuts which are sometimes provided on kitchen utensils.

The rear member C which is also made of flat metal set edgewise, is provided with an opening 4, having one wall provided with a series of steps enabling said opening to be used in removing and replacing nuts, and also in shaking the grates. At the end of the member C, a screwdriver blade 5 is provided, adjacent to which is a recess 6, which serves in co-operation with the screwdriver blade as a bottle opener. At the under side at one end, said member is provided with a curved hook 7, having a terminal stop 8, the purpose of which will be made clear upon reference to Fig. 1 of the drawing, wherein the hook is shown in engagement with the looped handle 20 of a kettle or vessel. The hook extends from the lower side of the tool away from the longitudinal center thereof. The kettle or vessel 16 has its bail 21 pivotally connected to ears 18 which are offset from the vessel, and extend above the plane of the cover 17. The latter is provided with a pair of diametrically opposite hooks 19, which depend below the cover and are formed with straight bills 22 to engage with the offset portion of the ears 18, as shown in Fig. 1 and Fig. 6. By this arrangement, the hooks retain the cover in position at all times, and yet when it is desired to obtain access to the kettle or vessel, by sliding the cover laterally, the hooks are carried out of engagement with the ears, there being no actual connection between the ears and the hooks, other than such hooked engagement as specified. The engagement of the hooks with the ears is of special advantage when the device is to be used in tilting the vessel or kettle, in the manner shown in Fig. 1 of the drawings, as the hooks prevent the cover from sliding off the kettle, which it would otherwise do if no means for this purpose were provided.

In using the bail for tilting a vessel or kettle, the hook 7 should be engaged with the looped handle 20 of the vessel or kettle 16, and then the bail 21 of the vessel should be engaged in either the recess or seat 12, or the recess 11, depending on whether or not the bail has a wooden spool or handle thereon. It should be noted that the hook 7 is below the horizontal plane of the seats 11 and 12. Then, by grasping the tool with one hand holding the handle member A, and the thumb resting on the spool or handle of the bail above the seat, the kettle is then tilted, and the water will pour out through the pouring lip or spout, the pressure of the water being sufficient to raise the cover slightly adjacent to the pouring lip of the vessel so as to allow the water to escape. During the tilting operation the cover confines the steam and prevents its escape.

While the tool could be used in tilting a vessel not having a cover with hooks, it would not then be anti-scalding in its operation, and therefore it is desired that the tool should be used in connection with a vessel having a cover provided with the hooks which prevent the cover from sliding off when tilting the vessel. So far as I am aware, the employment of a tool for this purpose, adapted to be used in tilting a vessel or kettle with the cover in place, has never been previously provided, and I do not wish to be limited to the details of the combination tool when this aspect of my invention is considered. Reduced to its simplest form, a tool having a hook at one end to engage with a looped handle of a vessel or kettle, and a seat at the other end to receive the bail of said kettle or vessel, when employed in connection with a cover for the vessel having engaging hooks or means to prevent said cover from sliding off, would come within my invention.

However, with the other features added, including a can opener, cork puller, screwdriver, bottle opener, stove-lid lifter, and wrenches, all combined in one tool, everything is conveniently at hand for instant use, and there is no occasion for the cook to hunt around for the various implements mentioned, as they are all combined in one compact implement.

The connection between the cover and the vessel, consisting of the hooks on the cover engaging ears on the vessel, provides a means of retaining the cover in place when putting the vessel on and taking it off the range. The hooks readily slide into and out of engagement with the ears, and when in engagement absolutely prevent the cover from sliding off. The advantages of this invention as a handy tool for use about the kitchen will be obvious to anyone conversant with the manifold duties of a cook, and they will not be further pointed out.

What I claim is:—

1. A combination kitchen tool, for use in connection with a vessel having a pair of ears, a hinged bail and a looped handle, and wherein the vessel is provided with a cover having hooks adapted to be slid into engagement with the ears to retain it in place, said tool comprising a hook at one end to be engaged with the looped handle, and a seat at the other end to receive said bail, whereby the vessel may be tilted with the cover in place so as to protect the hand of the operator.

2. A tool having a hook at one end, and a pair of open top seats at the other end, said seats opening out at one side of the tool and having side walls adapted to hold a bail, said seats being spaced longitudinally from each other and one of the seats being of greater capacity than the other, and said hook extending downwardly from the other side of the tool.

3. A tool comprising a front rigid member and a rear rigid member made of separate plates arranged edgewise, and a pair of plates riveted at their respective ends to the front and rear members and spaced apart and curved to constitute a heat nonconducting handle.

In testimony that I claim the foregoing as my own, I have hereto affixed my signature in the presence of two witnesses.

JOSEPH J. HOLSEN.

Witnesses:
ELSIE PASEWALK.
C. E. BRADY.